United States Patent Office 3,502,625
Patented Mar. 24, 1970

3,502,625
POLYIMIDES AND POLY(AMIDE - ACIDS) PREPARED FROM DIAMINES AND THIANTHRENETETRACARBOXYLIC ACID 5,5,10,10-TETRAOXIDES
Melvin Harris, Arlesheim, Switzerland, assignor to Eastman Kodak Company, Rochester, N.Y., a corporation of New Jersey
No Drawing. Filed Jan. 10, 1968, Ser. No. 696,723
Int. Cl. C08g 20/32
U.S. Cl. 260—78                        10 Claims

ABSTRACT OF THE DISCLOSURE

Polyimides of diamines and thianthrenetetracarboxylic acid 5,5,10,10-tetraoxides and poly(amide-acids) from which the polyimides are obtained.

---

This invention is directed to novel polyimides of diamines and thianthrenetetracarboxylic acid 5,5,10,10-tetraoxides and to certain poly(amide-acid) intermediates from which the polyimides are obtained.

It is an object of the present invention to provide novel film- and fiber-forming aromatic polyimides exhibiting outstanding physical and chemical properties including high thermal stability, resistance to hydrolysis, and retention of physical properties at elevated temperatures. Another object of the invention is to provide prepolymers as precursors for the novel polyimides which prepolymers are characterized by unexpectedly high solubility. Other objects of this invention will appear herein.

The novel aromatic polyimides of the invention are normally solid, high molecular weight polymers consisting essentially of the following recurring structural units:

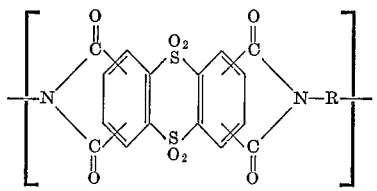

wherein R is a divalent organic radical; and the carbonyl groups are attached directly to separate carbon atoms on said aromatic rings, and each pair of carbonyl groups is attached to adjacent carbon atoms on said aromatic rings. R may be a divalent aromatic, aliphatic, cycloaliphatic, combination of aromatic and aliphatic, heterocyclic, and bridged organic radicals.

The polyimides of the invention may be prepared by reacting diamines and thianthrenetetracarboxylic dianhydride 5,5,10,10-tetraoxides having the structure

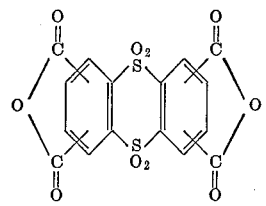

wherein the carbonyl groups are attached directly to separate carbon atoms on the aromatic rings and each pair of carbonyl groups is attached to adjacent carbon atoms on the aromatic ring to first produce normally solid, high molecular weight poly(amide-acids) consisting essentially of the following recurring structural units:

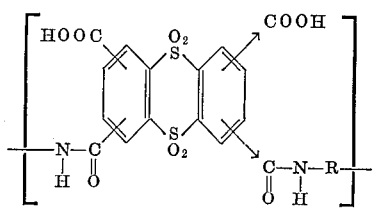

wherein → denotes isomerism and R is as defined above.

The resulting poly(amide-acids) may then be converted to the polyimides of this invention by suitable chemical or thermal treatment. The polyimides of this invention have an inherent viscosity of at least 0.1, preferably at least 0.3, the inherent viscosity being measured at 25° C. in a 0.5 percent solution of polymer in concentrated (96 percent) sulfuric acid. If the polyimide is not soluble in the acid to the extent of 0.5 percent, then its inherent viscosity is considered to be greater than 0.1.

The following equation will illustrate conversion of the poly(amide-acid) precursor to the polyimide of the invention:

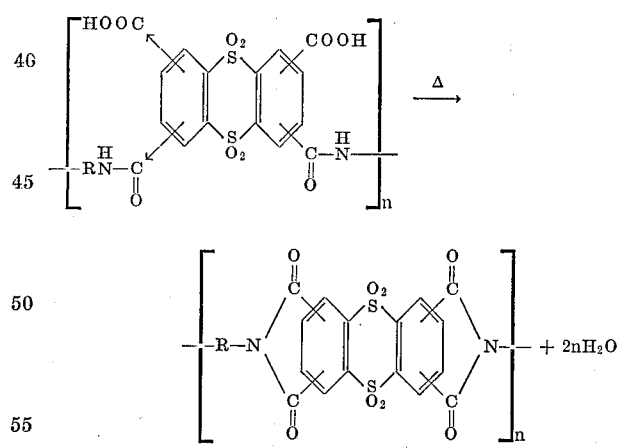

The thianthrenetetracarboxylic dianhydride 5,5,10,10-tetraoxide reactants of the present invention include 1,2,6,7-thianthrenetetracarboxylic dianhydride 5,5,10,10-tetraoxide; 1,2,7,8-thianthrenetetracarboxylic dianhydride 5,5,10,10 - tetraoxide; 1,2,8,9 - thianthrenetetracarboxylic dianhydride 5,5,10,10-tetraoxide; and 2,3,7,8-thianthrenetetracarboxylic dianhydride 5,5,10,10-tetraoxide, which compounds are represented respectively by Formulas 1, 2, 3, and 4.

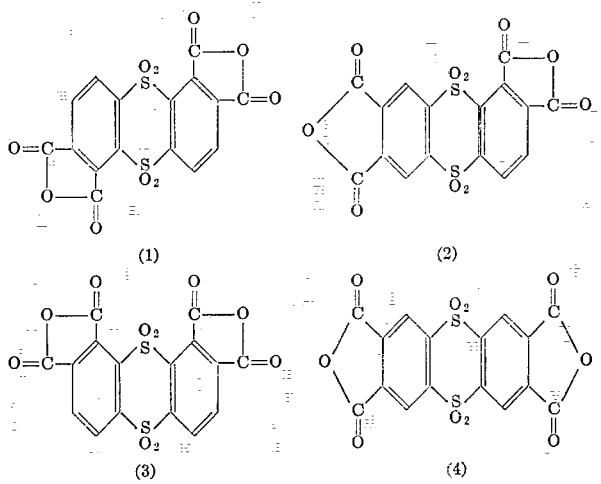

These compounds are suitably prepared by oxidation of the corresponding tetramethylthianthrene 5,5,10,10-tetraoxides with dilute nitric acid under autogenous pressure and then conversion to the corresponding dianhydrides by the removal of two molecules of water using techniques well known in the art.

The diamine reactants may be represented by the structure:

$$H_2N-R-NH_2$$

wherein R is a divalent organic radical which may be cyclic, heterocyclic, or acylic and includes a divalent aromatic, aliphatic, cycloaliphatic, combinations of aromatic and aliphatic, heterocyclic, bridged organic radicals wherein the bridge is, for instance, carbon, oxygen, sulfur, nitrogen, phosphorus, silicon, and the like. The preferred R groups in the diamines are divalent organic radicals containing at least five carbon atoms, especially radicals of at least six carbon atoms characterized by benzoid unsaturation such as arylene (e.g., phenylene, tolylene, xylylene, naphthylene, etc.), diarylene (e.g., diphenylene), and bridged aromatic radicals (e.g., diaryl ethers, silanes, sulfides, alkanes, and the like). Without limiting the invention to a specific number of diamines of this general structure, representative examples of suitable diamines are phenylenediamines; xylylenediamines; diaminodiphenyl ether; diaminodiphenyl sulfone; diaminodiphenylmethane; diaminodiphenylpropane; benzidine; diaminonaphthalenes; cyclobutanediamines; cyclohexanediamines; cyclohexanebis(methylamines); hexamethylenediamine; heptamethylenediamine; bis(amino-phenyl) diethyl silane; bis(amino-phenyl)phosphine oxide; diaminodiphenyl sulfide; diaminopyridine; diamino cyclohexane; diamino alkanes; etc. Suitable examples are represented by the following formulae:

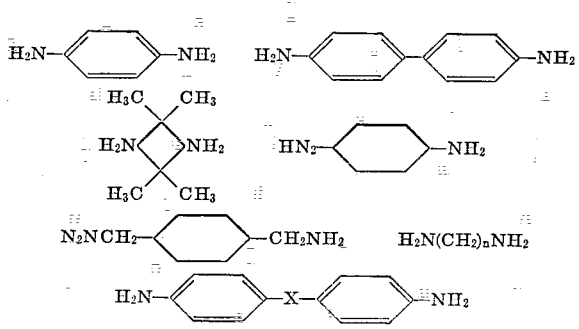

wherein X is a carbon, nitrogen, oxygen, silicon, phosphorus, or sulfur bridging atom, and $n$ is an integer from 2 to 10.

The reaction of dianhydrides and diamines, selected from the examples described above, is most advantageously carried out in a suitable inert solvent. Solvents used in the solution polymerization process for synthesizing the poly(amide-acid) of the present invention are relatively polar solvents whose functional groups do not react with either the dianhydrides or the diamines. Preferred solvents are the lower molecular members of the N,N-dialkylcarboxamide class such as N,N-dimethylformamide; N,N-dimethylacetamide; N,N-diethylformamide; N,N-diethylacetamide; and N-methyl-2-pyrrolidone. Dimethylsulfoxide; N-acetyl-2-pyrrolidone; formamide; and N-methylformamide are also suitable solvents. Since water may react with dianhydrides and hydrolyze the poly(amide-acid) precursors at this stage, it is preferred to employ anhydrous solvents and conduct the reaction under anhydrous conditions.

The conditions for the reaction of the dianhydrides and diamines of the invention can be varied considerably, but it is preferred to conduct the reaction at moderate temperatures, for example, about −20° to 100° C., preferably 0° to 50° C. The simplest method of preparation is the slow addition of solid dianhydride to a stirred solution of diamine until maximum viscosity is attained. Since the reaction is exothermic, the reaction solution is cooled to maintain the desired reaction temperature. It is advisable to agitate the solution polymerization system after the additions of dianhydride are completed until maximum viscosity denoting maximum polymerization is obtained; a total reaction period of one to two hours is usually sufficient. The amount of dianhydride required to give maximum viscosity is about one to five percent more than the theoretical amount. In the preparation of the poly(amide-acid) intermediate the inherent viscosity of the polymer should be at least 0.1. The inherent viscosity of the poly(amide-acid) is measured at 25° C. on a concentration of 0.5 gram of polymer per 100 ml. of dimethylacetamide.

The amount of solvent used in the preparation of the poly(amide-acid) should be sufficient to dissolve the diamine and the resulting polymer, and should provide a polymer solution of suitable consistency for further operations, such as fiber or film preparation. It has been found that the most successful results are obtained when the final polymeric solution contains up to 30 percent by weight of polymer component.

Following the preparation of the poly(amide-acid), this intermediate is converted to the polyimide by the elimination of water. This conversion can be accomplished by either chemical or thermal methods, or a combination of both. Examples of dehydrating agents suitable for converting poly(amide-acids) to poly(imides) are primary aliphatic acid anhydrides such as acetic anhydride, propionic anhydride, butyric anhydride, etc. The conversion to polyimide is also achieved by heating the poly(amide-acid) in a stream of an inert gas such as nitrogen.

This invention will be further illustrated by the following examples of preferred embodiments, although it will be understood that these examples are included merely for purposes of illustration and are not intended to liimt the scope of the invention.

EXAMPLE 1

A solution of 0.47 gram (2.38 mole) of 4,4′-methylenedianiline in 15 ml. of dimethylacetamide is stirred rapidly at 25° C. while one gram (2.38 mole) of 2,3,7,8-thianthrenetetracarboxylic dianhydrate 5,5,10,10-tetraoxide is slowly added. The inherent viscosity of the viscous dope is 1.11 (0.5 percent solution in dimethylacetamide).

The solution is cast onto glass plates, and the solvent is evaporated in a stream of dry nitrogen at 80° C. for 20 minutes. Poly(amide-acid) films of excellent clarity and toughness are stripped from the plates.

The conversion to polyimide is carried out by heating the poly(amide-acid) film in a stream of nitrogen, according to the following program: heat from room temperature to 150° C. over an interval of an hour, then to 200° C. during 30 minutes and hold at 200° C. for one hour, then heat to 300° C. over a period of two hours, and finally heat at 330° C. for 30 minutes. The polyimide is a strong flexible film, yellow-brown in color. It does not show evidence of appreciable degradation until it is heated to 440° C.

The polymer is characterized by its insolubility in solvents and basic reagents and by the appearance of the imide bands at 5.6 and 13.8 microns in the infrared spectrum.

EXAMPLE 2

4,4'-diaminodiphenyl ether, 0.476 gram (2.38 mole), is dissolved in 15 ml. of dimethylacetamide, and 1.00 gram (2.38 mole) of 2,3,7,8-thianthrenetetracarboxylic dianhydride 5,5,10,10-tetraoxide is added portionwise with agitation at 25° C. The inherent viscosity of the viscous dope is 1.17.

Films of excellent quality are cast from the dope and dried in an oven at 80° C. for 20 minutes. Conversion to the polyimide is carried out as described in Example 1.

EXAMPLES 3–8

As described in Example 1, 2,3,7,8-thianthrenetetracarboxylic dianhydride is added to various diamines, and films prepared from the poly(amide-acid) solutions are converted to polyimides by thermal treatment. The data is summarized in Table I.

TABLE I.—SUMMARY OF EXAMPLES 3–8

| Example | Diamine, g. | Dianhydride, g. | Solvent, ml. (dimethylacetamide) | Inherent viscosity [1] |
|---|---|---|---|---|
| 3 | Benzidine, 0.305 | 0.70 | 15 | 1.11 |
| 4 | 4,4'-diaminodiphenyl sulfone, 0.592 | 1.00 | 12 | 0.84 |
| 5 | Para-phenylenediamine, 0.257 | 1.00 | 14 | 1.07 |
| 6 | Meta-phenylenediamine, 0.129 | 0.50 | 8 | 0.93 |
| 7 | 1,6-diaminonaphthalene, 0.188 | 0.50 | 8 | 1.01 |
| 8 | 4,4'-diaminodiphenyl sulfide, 0.514 | 1.00 | 15 | 0.98 |

[1] Inherent viscosities of poly(amide-acid) before conversion to polyimide, determined at a concentration of 0.5 gram polymer per 100 ml. in dimethylacetamide at 25° C.

EXAMPLES 9–13

In accordance with the general method described in Example 1, thianthrenetetracarboxylic dianhydride 5,5,10,10-tetraoxides are added to various diamines, and films prepared from the poly(amide-acid) solutions are converted to polyimides by thermal treatment. The resulting compounds are summarized in Table II.

TABLE II

| Example | Thianthrene-tetra-carboxylic dianhydride tetraoxide | Diamine | Solvent |
|---|---|---|---|
| 9 | 2,3,7,8- | 1,4-cyclohexanebis-(methylamine) | Dimethyl formamide. |
| 10 | 1,2,7,8- | 1,6-hexanediamine | Do. |
| 11 | [1] 1,2,7,8/2,3,7,8- | 4,4'-methylenedianiline | Dimethyl acetamide. |
| 12 | 1,2,7,8- | 2,2,4,4-tetramethyl-1,3-cyclobutanediamine | Dimethyl sulfoxide. |
| 13 | [1] 1,2,7,8/2,3,7,8- | Ethylene diamine | N-methyl-pyrrolidone. |

[1] Mixture of isomers (approximately 60:40) obtained by oxidation of tetramethylthianthrenes derived from o-xylene and sulfur chloride.

It is well known in the preparation of polyimides of pyromellitic acid, that the poly(amide-acid) precursors become insoluble when a relatively low percentage (less than 30 percent of the amide-acid groupings) are converted to imide groups. It was quite unexpected to find in the present invention, that the poly(amide-acid) precursors of the thianthrenetetracarboxylic anhydride 5,5, 10,10-tetraoxides could be dehydrated to high imide content without becoming insoluble. Polymers still soluble in polar solvents were prepared with as high as 75 percent of the amide-acid groupings converted to imide linkages. Thus, it is possible to determine the viscosity of a polymer during the dehydration process up to a stage just short of complete imidization. In Table III, the inherent viscosities are listed for poly(amide-acid) films prepared from 2,3,7,8-thianthrenetetracarboxylic dianhydride 5,5,10,10-tetraoxides and selected diamines and subjected to thermal imidization treatment at temperatures up to 250° C. Poly-(amide-acids) of pyromellitic anhydride may tend to become insoluble by thermal treatment at 150° C. or less.

TABLE III.—INHERENT VISCOSITY [1] AT VARIOUS CURING TEMPERATURES

| Diamine | 25° C. | 80° C. | 150° C. | 200° C. | 250° C. |
|---|---|---|---|---|---|
| $H_2N-\bigcirc-CH_2-\bigcirc-NH_2$ | 1.02 | 0.87 | 0.83 | 0.87 | 0.87 |
| $H_2N-\bigcirc-O-\bigcirc-NH_2$ | 1.09 | 0.98 | 0.91 | 0 92 | 0.94 |
| $H_2N-\bigcirc-S-\bigcirc-NH_2$ | 0.96 | 0.91 | 0.82 | 0.84 | 0.84 |

[1] Inherent viscosities were determined at a concentration of 0.5 gram polymer per 100 ml. solution in dimethylacetamide at 25° C.
[2] Poly(amide-acid) solution (before preparation of film).

This unusual solubility of the polymers of the invention, even at relatively high conversion of the poly(amide-acid) to the polyimide, presents a feature of considerable utility. A soluble polymer, suitable for preparation of films and spinning of fibers, can be prepared which requires substantially less chemical or thermal imidization treatment to produce the final insoluble polyimide. Furthermore, soluble prepolymers can be formulated in solutions of improved stability, lacking any tendency to gel formation from premature imidization. Solutions of poly(amide-acids) are generally not stable and show a decrease in inherent viscosity on storage; this effect is apparently due to moisture sensitivity of the amide-acid grouping. The polymers of the present invention permit the formulation of a solution of a more stable polymer, that is, a polymer with a high imide content and correspondingly lower percentage of moisture-sensitive amide-acid linkages.

The invention has been described in detail with particular reference to preferred embodiments thereof, but it will be understood that variations and modifications can be effected within the spirit and scope of the invention as described hereinabove and as defined in the appended claims.

I claim:
1. A normally solid, high molecular weight polyimide consisting essentially of the following recurring structural units:

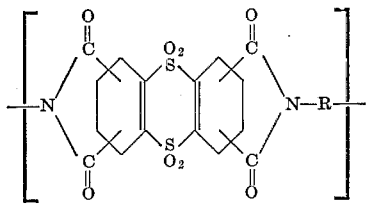

wherein R is a divalent organic radical and the carbonyl groups are attached directly to separate carbon atoms on the aromatic rings and each pair of carbonyl groups is attached to adjacent carbons on the aromatic rings, said polyimide having an inherent viscosity of at least 0.1 measured at 25° C. in a 0.5% solution of polyimide in concentrated sulfuric acid.

2. A polyimide as defined by claim 1 wherein R is a divalent hydrocarbon radical.

3. A polyimide as defined by claim 2 wherein the divalent hydrocarbon radical is a divalent aromatic radical.

4. A polyimide as defined by claim 2 wherein the divalent hydrocarbon radical is a divalent aliphatic radical.

5. A normally solid poly(amide-acid) consisting essentially of the following recurring structural units:

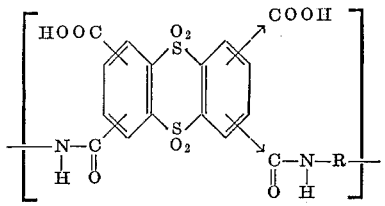

wherein → denotes isomerization, R is a divalent organic radical, and the carbonyl groups are attached directly to separate carbon atoms on the aromatic rings and each pair of carbonyl groups is attached to adjacent carbons on the aromatic rings, said poly(amide-acid) having an inherent viscosity of at least 0.1 measured at 25 degrees C. on a concentration of 0.5 gram of polymer per 100 ml. of dimethylacetamide.

6. A poly(amide-acid) as defined by claim 5 wherein R is a divalent hydrocarbon radical.

7. A poly(amide-acid) as defined by claim 6 wherein the divalent hydrocarbon radical is a divalent aromatic radical.

8. A poly(amide-acid) as defined by claim 6 wherein R is a divalent aliphatic radical.

9. A film of a polyimide as defined by claim 1.
10. A fiber of a polyimide as defined by claim 1.

References Cited
UNITED STATES PATENTS

| | | | |
|---|---|---|---|
| 3,179,614 | 4/1965 | Edwards | 260—30.2 |
| 3,179,634 | 4/1965 | Edwards | 260—78 |
| 3,356,648 | 12/1967 | Rogers | 260—47 |
| 3,410,868 | 11/1968 | Harris | 260—327 |
| 3,414,543 | 12/1968 | Paufler | 260—47 |
| 3,420,795 | 1/1969 | Angelo | 260—47 |

WILLIAM H. SHORT, Primary Examiner

H. SCHAIN, Assistant Examiner

U.S. Cl. X.R.

260—30.2, 30.8, 32.6, 47

PO-1050
(5/69)

UNITED STATES PATENT OFFICE
CERTIFICATE OF CORRECTION

Patent No. 3,502,625        Dated March 24, 1970

Inventor(s) Melvin Harris

It is certified that error appears in the above-identified patent and that said Letters Patent are hereby corrected as shown below:

Column 4, line 69, the word "dianhydrate" should be ---dianhydride---; Column 6, Table III, the second formula should read:

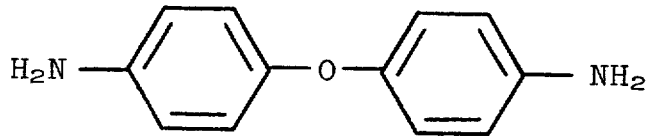

Column 6, Table III, the second number under the sub-heading "200°C." should read ---0.92---; Column 7, lines 29-37, the formula should read:

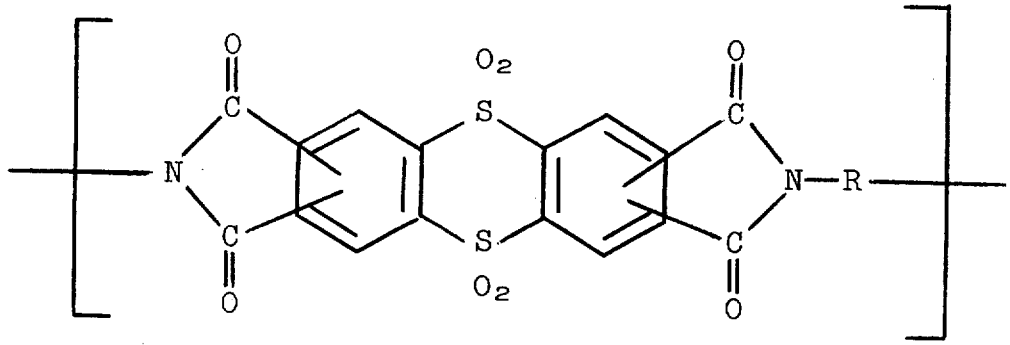

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents